(12) United States Patent
Nabeshima et al.

(10) Patent No.: US 11,512,412 B2
(45) Date of Patent: Nov. 29, 2022

(54) SHEET MOLDING COMPOUND AND CARBON FIBER COMPOSITE MATERIAL MOLDED ARTICLE

(71) Applicant: Mitsubishi Chemical Corporation, Tokyo (JP)

(72) Inventors: Yasuhiko Nabeshima, Tokyo (JP); Yasunori Murano, Tokyo (JP); Akira Oota, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/015,381

(22) Filed: Sep. 9, 2020

(65) Prior Publication Data

US 2020/0407886 A1 Dec. 31, 2020

Related U.S. Application Data

(63) Continuation of application No. PCT/JP2019/007882, filed on Feb. 28, 2019.

(30) Foreign Application Priority Data

Mar. 16, 2018 (JP) .............................. JP2018-049296

(51) Int. Cl.
*D01F 11/14* (2006.01)
*B29C 43/00* (2006.01)
(Continued)

(52) U.S. Cl.
CPC ............ *D01F 11/14* (2013.01); *B29C 43/003* (2013.01); *B29C 43/006* (2013.01); *C08J 5/243* (2021.05);
(Continued)

(58) Field of Classification Search
CPC ..... D10B 2101/12; D04H 1/4242; D02J 3/02; B29K 2063/00; B29K 2105/12;
(Continued)

(56) References Cited

U.S. PATENT DOCUMENTS 6,592,986 B1 * 7/2003 Hakotani .............. B29C 70/025
428/295.1
2001/0009308 A1 7/2001 Kinpara et al.
(Continued)

FOREIGN PATENT DOCUMENTS

CN 104017334 * 9/2014
CN 106750444 * 5/2017
(Continued)

OTHER PUBLICATIONS

JER828 Material Datasheet, accessed online Oct. 18, 2021.*
(Continued)

*Primary Examiner* — Camie S Thompson
(74) *Attorney, Agent, or Firm* — Morgan, Lewis & Bockius LLP (57) ABSTRACT

Provided is a sheet molding compound having excellent thick portion-molding properties that can inhibit the occurrence of internal cracks even during the molding of a thick portion and enables a carbon fiber composite material molded article to be excellently released from a die. Also provided is a carbon fiber composite material molded article. The sheet molding compound of the present invention contains a fiber substrate (A) containing carbon fiber and a thermosetting resin composition (B), in which an average fiber length of the carbon fiber is 5 mm or more, and a volumetric molding shrinkage rate of the thermosetting resin composition (B) is 0.5% or more and 4.4% or less. Furthermore, the carbon fiber composite material molded article of the present invention has a thick portion having a thickness
(Continued)

of 10 mm or more, in which the thick portion is formed of a cured material of the sheet molding compound of the present invention.

21 Claims, 1 Drawing Sheet

(51) Int. Cl.
    *D01F 9/12*     (2006.01)
    *D06M 15/273*     (2006.01)
    *D06M 15/55*     (2006.01)
    *C08J 5/24*     (2006.01)
    *B29K 105/08*     (2006.01)
    *B29K 105/00*     (2006.01)
    *D06M 101/40*     (2006.01)

(52) U.S. Cl.
    CPC ............ *D01F 9/12* (2013.01); *D06M 15/273* (2013.01); *D06M 15/55* (2013.01); *B29K 2105/0872* (2013.01); *B29K 2105/251* (2013.01); *B29K 2863/00* (2013.01); *B29K 2907/04* (2013.01); *D06M 2101/40* (2013.01)

(58) Field of Classification Search
    CPC ... B29K 2307/04; B29C 70/12; B29C 70/502; B29C 70/54; B29B 15/122; C08J 5/24; C08J 5/042; C08J 5/10; C08J 2363/00; C08L 63/00; C08L 33/12
    USPC ........................... 428/297.4, 301.4, 332, 413
    See application file for complete search history.

(56) References Cited

U.S. PATENT DOCUMENTS

| | | |
|---|---|---|
| 2006/0249869 A1 | 11/2006 | Sumner et al. |
| 2017/0298199 A1 | 10/2017 | Akiyama et al. |
| 2018/0142057 A1 | 5/2018 | Oota et al. |
| 2018/0250849 A1* | 9/2018 | Samejima .............. D01D 11/02 |

FOREIGN PATENT DOCUMENTS

| | | |
|---|---|---|
| EP | 3656806 A1 | 5/2020 |
| JP | 3463608 B2 | 11/2003 |
| JP | 2005-247879 A | 9/2005 |
| JP | 2006-213746 A | 8/2006 |
| JP | 2008-007630 A | 1/2008 |
| JP | 2013-032510 A | 2/2013 |
| JP | 5170506 B2 | 3/2013 |
| JP | 5247733 B2 | 7/2013 |
| JP | 5293945 B2 | 9/2013 |
| JP | 5987995 B2 | 9/2016 |
| JP | 2017-193599 A | 10/2017 |
| WO | 2016/182077 A1 | 11/2016 |

OTHER PUBLICATIONS

International Search Report issued in corresponding International Patent Application No. PCT/JP2019/007882, dated May 7, 2019.
Office Action issued in corresponding Japanese Patent Application No. 2019-516022, dated Mar. 3, 2020.
Extended European Search Report dated Mar. 19, 2021, issued in corresponding European Patent Application No. 19767051.6.
Office Action dated Jul. 6, 2022, issued in corresponding Chinese Patent Application No. 201980016015.8.

* cited by examiner

SHEET MOLDING COMPOUND AND CARBON FIBER COMPOSITE MATERIAL MOLDED ARTICLE

This application is a continuation application of International Application No. PCT/JP2019/007882, filed on Feb. 28, 2019, which claims the benefit of priority of the prior Japanese Patent Application No. 2018-049296, filed Mar. 16, 2018, the content of which is incorporated herein by reference.

TECHNICAL FIELD

The present invention relates to a sheet molding compound and a carbon fiber composite material molded article.

BACKGROUND ART

Sheet molding compound (hereinafter, also described as "SMC") is a material impregnated with a resin composition containing a thermosetting resin into a sheet-like reinforcing fiber group, in which short cut reinforcing fibers are piled up. A cured and molded article formed of SMC has excellent appearance, mechanical characteristics, water resistance, corrosion resistance, and the like. Therefore, the product is widely used in the field of household appliances, automobiles, electric instruments, and the like.

The length of the reinforcing fiber in SMC is short. Therefore, although the mechanical characteristics of the molded article formed of SMC are poorer than those of prepreg containing continuous fiber, SMC is appropriate for producing a molded article having differential thickness or a molded article of a complicated shape having fine irregularities, each of which is difficult to mold with prepreg.

Although a cured and molded article formed of SMC is usually produced by press-molding SMC, in a case where SMC is cured by press-molding, due to the cure shrinkage that occurs during curing, the heating resulting from a curing reaction, thermal contraction resulting from cooling after the curing reaction, and the like, distortion frequently occurs in the interior of the molded article. In the case of a molded article having a thick portion, serious interior distortion occurs in the thick portion, and a shaping failure such as an internal crack, a sink mark, deformation, or the like easily occurs.

As a method for inhibiting a sink mark that occurs on the surface of a molded article due to the volumetric shrinkage in a case where a thermosetting resin is cast-molded, the following method is suggested although this is not a technique relating to the press-molding of SMC.

(1) Method of disposing a core material in a die, injecting a thermosetting resin into the periphery of the core material (a volumetric molding shrinkage rate: 4.5% to 7%), and performing curing (Patent Literature 1).

(2) Method using a radically curable resin composition (a volumetric molding shrinkage rate: 4.5% to 10.5%) that shrinks little and does not impair transparency without using a shrinkage reducing agent (Patent Literature 2).

As molded articles formed of SMC in which the occurrence of an internal crack, a sink mark, and deformation in a thick portion is inhibited, the following molded articles are suggested.

(3) Molded article including a thick portion constituted with an inner layer which is formed of a cured material of a glass fiber-containing bulk molding compound and a surface layer which is formed of a cured material of glass fiber-containing SMC (hereinafter, also described as "GF-SMC") surrounding the inner layer (Patent Literature 3).

(4) Molded article including a thick portion constituted with an inner layer which is formed of a cured material of GF-SMC with a high glass fiber content rate and a surface layer which is formed of a cured material of GF-SMC with a low glass fiber content rate that surrounds the inner layer (Patent Literature 4).

In recent years, as reinforcing fiber, carbon fiber has drawn attention because this has a high specific strength and a high specific elastic modulus and makes it possible to greatly lighten a molded article. For the reinforcing fiber contained in SMC, glass fiber is increasingly replaced with carbon fiber. (Patent Literature 5 and 6).

However, molding a thick portion by using SMC containing carbon fiber (hereinafter, also described as "CF-SMC") as reinforcing fiber is more difficult than molding a thick portion by using GF-SMC.

CITATION LIST

Patent Literature

[Patent Literature 1] Japanese Patent No. 3463608
[Patent Literature 2] Japanese Unexamined Patent Application, First Publication No. 2006-213746
[Patent Literature 3] Japanese Patent No. 5247733
[Patent Literature 4] Japanese Patent No. 5293945
[Patent Literature 5] Japanese Patent No. 5170506
[Patent Literature 6] Japanese Patent No. 5987995

SUMMARY OF INVENTION

Technical Problem

Compared to GF-SMC, CF-SMC conducts heat better and is stiffer. Furthermore, in a case where the CF-SMC is press-molded to produce a molded article having a thick portion, distortion and cracks easily occur in the interior of the molded article. In addition, compared to GF-SMC, CF-SMC has a larger fiber tow width and a lower specific gravity.

As effective means for improving the thick portion-molding properties of GF-SMC, there is a method of adding a large amount of a thermoplastic resin-type shrinkage reducing agent or an inorganic filler such as calcium carbonate. However, applying this method to CF-SMC is not preferable, because impregnation properties or uniformity tends to be impaired, and the specific gravity increases.

For these reasons, it is difficult to improve the internal cracks that occur during the molding of a thick product without impairing the excellent characteristics of CF-SMC.

Even though the methods (1) and (2) relating to cast molding and the techniques (3) and (4) using GF-SMC are applied to the press-molding of CF-SMC, the thick portion-molding properties of CF-SMC are not sufficiently improved. Particularly, in a case where the techniques of (3) and (4) are applied to improve the thick portion-molding properties of CF-SMC, CF-SMC tends to be affected by the difference in thermal expansion and thermal contraction between materials having different characteristics, and internal cracks easily occur at the interface.

Furthermore, in molding a thick portion by using CF-SMC, it is also important to ensure die release properties such that the molded article is released from a die.

An object of the present invention is to provide a sheet molding compound (CF-SMC) having excellent thick portion-molding properties that can inhibit the occurrence of internal cracks even during the molding of a thick portion and enables a carbon fiber composite material molded article to be excellently released from a die. Another object of the present invention is to provide a carbon fiber composite material molded article.

Solution to Problem

The present invention has the following constitutions.

[1] SMC containing a fiber substrate (A) containing carbon fiber and a thermosetting resin composition (B), in which an average fiber length of the carbon fiber is 5 mm or more, and
a volumetric molding shrinkage rate of the thermosetting resin composition (B) is 0.5% or more and 4.4% or less.

[2] SMC described in [1], in which a content rate of the carbon fiber contained in the sheet molding compound (100 mass %) is 30 mass % or more and 70 mass % or less.

[3] SMC described in [1] or [2], in which the SMC is for producing a carbon fiber composite material molded article including a thick portion having a thickness of 10 mm or more.

[4] SMC described in any one of [1] to [3], in which the thermosetting resin composition (B) contains a vinyl ester resin.

[5] SMC described in any one of [1] to [4], in which the thermosetting resin composition (B) contains an epoxy resin.

[6] SMC described in [5], in which an epoxy equivalent of the epoxy resin is in a range of 100 to 1,000.

[7] SMC described in any one of [1] to [6], in which the thermosetting resin composition (B) contains a shrinkage reducing agent.

[8] SMC described in [7], in which the shrinkage reducing agent is polyfunctional (meth)acrylate.

[9] A carbon fiber composite material molded article including a thick portion having a thickness of 10 mm or more, in which the thick portion is formed of a cured material of SMC described in any one of [1] to [8].

[10] The carbon fiber composite material molded article described in [9], in which the carbon fiber composite material molded article has a specific gravity of 1.56 or less.

Advantageous Effects of Invention

In a case where SMC of the present invention is used, the occurrence of internal cracks can be inhibited even during the molding of a thick portion, and a carbon fiber composite material molded article excellently released from a die is obtained.

DESCRIPTION OF EMBODIMENTS

The following definitions of terms are applied to the present specification and claims.

"Sheet molding compound (SMC)" means a sheet-like uncured composite material containing reinforcing fiber which is short fiber and a thermosetting resin.

"Epoxy resin" is a generic term for thermosetting compounds having two or more reactive epoxy groups in a molecule.

"Vinyl ester resin" is a resin obtained by addition reaction of a vinyl group-containing monobasic acid (carboxylic acid or the like) with an epoxy resin.

"Volumetric molding shrinkage rate of a thermosetting resin composition" is a cure shrinkage rate calculated by the following equation by using a difference between specific gravities that are measured before and after the curing of a thermosetting resin composition according to a density measurement method (JIS K-5600 2-4).

$$r=\{(ds-dl)/dl\}\times 100$$

(In the above equation, r represents a volumetric molding shrinkage rate (%); dl represents a specific gravity of a liquid thermosetting resin composition that is measured using a specific gravity bottle method before the composition is cured; and ds represents a specific gravity of a cured material of the thermosetting resin composition that is measured by a specific gravity measurement method for solids (weighing in a liquid)).

"Average fiber length of carbon fiber" is the average length of 100 carbon fiber filaments randomly selected from the fiber substrate (A).

"(Meth)acrylic acid" means an acrylic acid or a methacrylic acid.

"(Meth)acrylate" means acrylate or methacrylate.

<Sheet Molding Compound>

The sheet molding compound (SMC) of the present invention is CF-SMC containing a fiber substrate (A) containing carbon fiber and a thermosetting resin composition (B). SMC of the present invention can be suitably used as SMC for molding a carbon fiber composite material molded article (hereinafter, also simply referred to as "molded article") with a thick portion having a thickness of 10 mm or more.

The fiber substrate (A) is a substrate containing carbon fiber.

The form of the fiber substrate (A) is not particularly limited, and examples thereof include a substrate in which short fiber tows, which are prepared by cutting carbon fiber tows constituted with continuous carbon fiber aligned in one direction in a specific length, are arranged in the form of a mat.

Examples of the carbon fiber include polyacrylonitrile (PAN)-based carbon fiber, rayon-based carbon fiber, pitch-based carbon fiber, and the like. As the carbon fiber, PAN-based carbon fiber is preferable because this fiber improves the compression strength of the molded article. It is preferable that the carbon fiber is in the form of a short fiber tow, because then the molding properties of SMC and the mechanical characteristics of the molded article are balanced well.

The average fiber length of the carbon fiber contained in the fiber substrate (A) is 5 mm or more, preferably 10 mm or more, and more preferably 20 mm or more. In a case where the average fiber length of the carbon fiber is the lower limit of the above range ore more, the mechanical characteristics of the molded article are excellent.

The average fiber length of the carbon fiber is preferably 50 mm or less, more preferably 40 mm or less, and even more preferably 30 mm or less. In a case where the average fiber length of the carbon fiber is the upper limit of the above range or less, the molding properties of SMC are excellent.

The average fiber length of the carbon fiber is, for example, preferably 5 mm or more and 50 mm or less, more preferably 10 mm or more and 40 mm or less, and even more preferably 20 mm or more and 30 mm or less.

In view of the molding properties of SMC, the mechanical characteristics and weight lightening of a molded article, the content rate of the carbon fiber contained in SMC (100 mass %) of the present invention is preferably 30 mass % or more and 70 mass % or less, and more preferably 40 mass % or more and 60 mass % or less. In a case where the content rate of the carbon fiber contained in SMC is the lower limit of the above range or more, the strength or stiffness of the molded article is sufficiently improved. Therefore, the thickness of the molded article does not need to be increased, and the molded article can be lightened. In addition, the content rate of a resin is reduced, and it is more difficult for internal cracks to occur. In a case where the content rate of the carbon fiber contained in SMC is the upper limit of the above range or less, the molding properties of SMC are further improved, and a molded article having a more complicated shape can be produced.

Unless the effects of the present invention are impaired, the fiber substrate (A) may contain other reinforcing fiber in addition to the carbon fiber. Examples of those other reinforcing fiber include glass fiber and the like.

The content rate of the carbon fiber contained in the fiber substrate (A) with respect to the total number (mass) of reinforcing fiber in the fiber substrate (A) is preferably 40% or more, more preferably 60% or more, even more preferably 80% or more, and particularly preferably 100%.

In a case where carbon fiber and glass fiber are used as the fiber substrate (A), the content rate of the carbon fiber contained in the fiber substrate (A) with respect to the total number (total number of strands) of reinforcing fiber in the fiber substrate (A) is preferably 80% or more, more preferably 90% or more, and even more preferably 96% or more.

The thermosetting resin composition (B) is a resin composition that contains a thermosetting resin and has a volumetric molding shrinkage rate 0.5% or more and 4.4% or less.

The volumetric molding shrinkage rate of the thermosetting resin composition (B) is 4.4% or less, preferably 4.0% or less, more preferably 3.6% or less, and even more preferably 3.2% or less. In a case where the volumetric molding shrinkage rate of the thermosetting resin composition (B) is the upper limit of the above range or more, the internal distortion that occurs during the molding of a thick portion is reduced, and internal cracks hardly occur.

The volumetric molding shrinkage rate of the thermosetting resin composition (B) is 0.5% or more, preferably 0.7% or more, and more preferably 1.0% or more. In a case where the volumetric molding shrinkage rate of the thermosetting resin composition (B) is the lower limit of the above range or more, the molded article is excellently released from a die during the molding of a thick portion.

The volumetric molding shrinkage rate of the thermosetting resin composition (B) is 0.5% or more and 4.4% or less. For example, the volumetric molding shrinkage rate is preferably 0.7% or more and 4.0% or less, more preferably 1.0% or more and 3.6% or less, and even more preferably 1.0% or more and 3.2% or less.

The thermosetting resin is not particularly limited, and examples thereof include an unsaturated polyester resin, an epoxy resin, a phenol resin, a silicone resin, a vinyl ester resin, and the like.

Among these resins, in view of versatility, mechanical characteristics, molding properties, and cure shrinkage, an unsaturated polyester resin, an epoxy resin, and a vinyl ester resin are preferable. Among these, a vinyl ester resin is more preferable in view of release properties and fluidity during molding, and an epoxy resin is more preferable because this resin has particularly excellent mechanical characteristics and less causes cure shrinkage.

The thermosetting resin composition (B) may contain one kind of thermosetting resin or two or more kinds of thermosetting resins.

As the unsaturated polyester resin, unsaturated polyester resins used in CF-SMC can be used without limitation. Examples of the unsaturated polyester resin include a resin obtained by causing a condensation reaction between a dicarboxylic acid including an unsaturated dicarboxylic acid and a divalent glycol.

Examples of the epoxy resin include a bisphenol A epoxy resin, a cyclic aliphatic epoxy resin, a novolac epoxy resin, a heat-resistant epoxy resin, and the like.

In a case where the epoxy resin is used, an epoxy equivalent of this resin (number of grams of the resin containing 1 gram equivalent of epoxy groups (g/eq)) is preferably in a range of 100 to 1000. In a case where the epoxy equivalent is 100 or more, SMC that less undergoes cure shrinkage tends to be obtained. The epoxy equivalent is more preferably 110 or more, and even more preferably 150 or more. Furthermore, in a case where the epoxy equivalent is 1000 or less, the fiber substrate tends to be excellently impregnated with the resin composition during the production of SMC. The epoxy equivalent is more preferably 500 or less, and even more preferably 300 or less.

As the vinyl ester resin, vinyl ester resins used in CF-SMC can be used without limitation. Examples of the vinyl ester resin include an epoxy (meth)acrylate resin obtained by addition reaction of a (meth)acrylic acid with an epoxy resin, and the like.

The thermosetting resin composition (B) may contain other components in addition to the thermosetting resin.

It is preferable that the thermosetting resin composition (B) further contains a curing agent, because then a tough cured material that is not dissolved or melted can be formed.

The thermosetting resin composition (B) may contain one kind of curing agent or two or more kinds of curing agents.

In a case where a vinyl ester resin is used, examples of the curing agent include an organic peroxide and the like.

Examples of an organic peroxide include peroxyketal, peroxycarbonate, ketone peroxide, diacyl peroxide, dialkyl peroxide, alkyl perester, and the like.

In a case where the epoxy resin is used, examples of the curing agent include aliphatic polyamine, polyamide, aromatic diamine, an acid anhydride, tertiary amine, and the like.

It is preferable that the thermosetting resin composition (B) further contains a polyisocyanate compound as a thickener and a reactive diluent, because then the mechanical characteristics of the molded article and the molding properties are improved. Particularly, in a case where the thermosetting resin composition (B) contains an unsaturated polyester resin as a thermosetting resin, it is more preferable that the thermosetting resin composition (B) further contains a polyisocyanate compound and a reactive diluent.

Examples of the polyisocyanate compound include diphenylmethane diisocyanate, hexamethylene diisocyanate, tolyene diisocyanate, xylene diisocyanate, 4,4'-methylenebis(cyclohexylisocyanate), isophorone diisocyanate, trimethylhexamethylene diisocyanate, and the like.

The thermosetting resin composition (B) may contain one kind of polyisocyanate compound or two or more kinds of polyisocyanate compounds.

Examples of the reactive diluent include a vinyl monomer, a monofunctional (meth)acrylate, and the like. The thermosetting resin composition (B) may contain one kind of reactive diluent or two or more kinds of reactive diluents.

Examples of the vinyl monomer include styrene, α-methylstyrene, α-ethylstyrene, vinyl toluene, and the like.

Examples of the monofunctional (meth)acrylate include methyl (meth)acrylate, ethyl (meth)acrylate, isopropyl (meth)acrylate, n-butyl (meth)acrylate, t-butyl (meth)acrylate, isobutyl (meth)acrylate, 2-ethylhexyl (meth)acrylate, lauryl (meth)acrylate, alkyl (meth)acrylate (having 12 or 13 carbon atoms), tridecyl (meth)acrylate, stearyl (meth)acrylate, cyclohexyl (meth)acrylate, benzyl (meth)acrylate, isobornyl (meth)acrylate, glycidyl (meth)acrylate, tetrahydrofurfuryl (meth)acrylate, allyl (meth)acrylate, 2-hydroxyethyl (meth)acrylate, hydroxypropyl (meth)acrylate, 2-methoxyethyl (meth)acrylate, 2-ethoxyethyl (meth)acrylate, dimethylaminoethyl (meth)acrylate, dimethylaminoethyl methyl (meth)acrylate, dimethylaminoethyl benzyl (meth)acrylate, diethylaminoethyl (meth)acrylate, trifluoroethyl (meth)acrylate, heptadecafluorodecyl (meth)acrylate, dicyclopentenyl (meth)acrylate, dicyclopentenyloxyethyl (meth)acrylate, dicyclopentanyl (meth)acrylate, methoxypolyethylene glycol (meth)acrylate, and the like.

Particularly, in a case where the thermosetting resin composition (B) contains a vinyl ester resin as a thermosetting resin, it is preferable that the composition (B) further contains a shrinkage reducing agent.

In this case, it is more preferable to use a shrinkage reducing agent that stays in liquid state at room temperature, because then the fiber substrate (A) tends to be excellently impregnated with the resin composition during the production of SMC.

Examples of the shrinkage reducing agent include polyfunctional (meth)acrylate and the like.

The thermosetting resin composition (B) may contain one kind of shrinkage reducing agent or two or more kinds of shrinkage reducing agents.

Examples of the polyfunctional (meth)acrylate include ethylene glycol di(meth)acrylate, diethylene glycol di(meth)acrylate, triethylene glycol di(meth)acrylate, polyethylene glycol di(meth)acrylate (n=4 to 23), propylene glycol di(meth)acrylate, dipropylene glycol di(meth)acrylate, tripropylene glycol di(meth)acrylate, polypropylene glycol di(meth)acrylate (n=4 to 10), 2-butyl-2-ethyl-1,3-propanediol di(meth)acrylate, 2-hydroxy-1,3-propanediol di(meth)acrylate, butanediol di(meth)acrylate, 1,3-butylene glycol di(meth)acrylate, polybutylene glycol di(meth)acrylate (n=8 or 9), neopentyl glycol di(meth)acrylate, pentanediol di(meth)acrylate, 1,6-hexanediol di(meth)acrylate, trimethylolethane tri(meth)acrylate, trimethylolpropane tri(meth)acrylate, tetramethylolmethane tri(meth)acrylate, tetramethylolmethane tetra(meth)acrylate, pentaerythritol di(meth)acrylate, dipentaerythritol di(meth)acrylate, sorbitol di(meth)acrylate, trishydroxyethyl isocyanurate, nonanediol di(meth)acrylate, tris(2-(meth)acryloyloxyethyl)isocyanurate, 2,2-bis[4-((meth)acryloxyethoxy)phenyl]propane, 2,2-bis[4-((meth)acryloxydiethoxy)phenyl]propane, 2,2-bis[4-((meth)acryloxypolyethoxy)phenyl]propane (n=3 to 30), 2-hydroxy-1-acryloxy-3-methacryloxypropane, and the like.

Examples of other components used in addition to the curing agent, the polyisocyanate compound, the reactive diluent, and the shrinkage reducing agent include resins other than the thermosetting resin, a filler other than the reinforcing fiber, an internal release agent, a defoaming agent, a flame retardant, a weather fastness enhancer, an antioxidant, a heat stabilizer, an ultraviolet absorber, a plasticizer, a lubricant, a colorant, a compatibilizer, a thickener other than the polyisocyanate compound, a polymerization inhibitor, a rubber reinforcing agent, a surface coating agent, and the like.

(Method for Producing SMC)

The method for producing SMC of the present invention is not particularly limited. For example, SMC is produced by a method of impregnating the fiber substrate (A) with the thermosetting resin composition (B) and keeping the fiber substrate (A) as it is for a certain period of time such that the thermosetting resin composition (B) is thickened.

Hereinafter, as an example of the method for producing SMC of the present invention, a method using an SMC producing apparatus 10 illustrated in FIG. 1 will be described.

Figure 1:
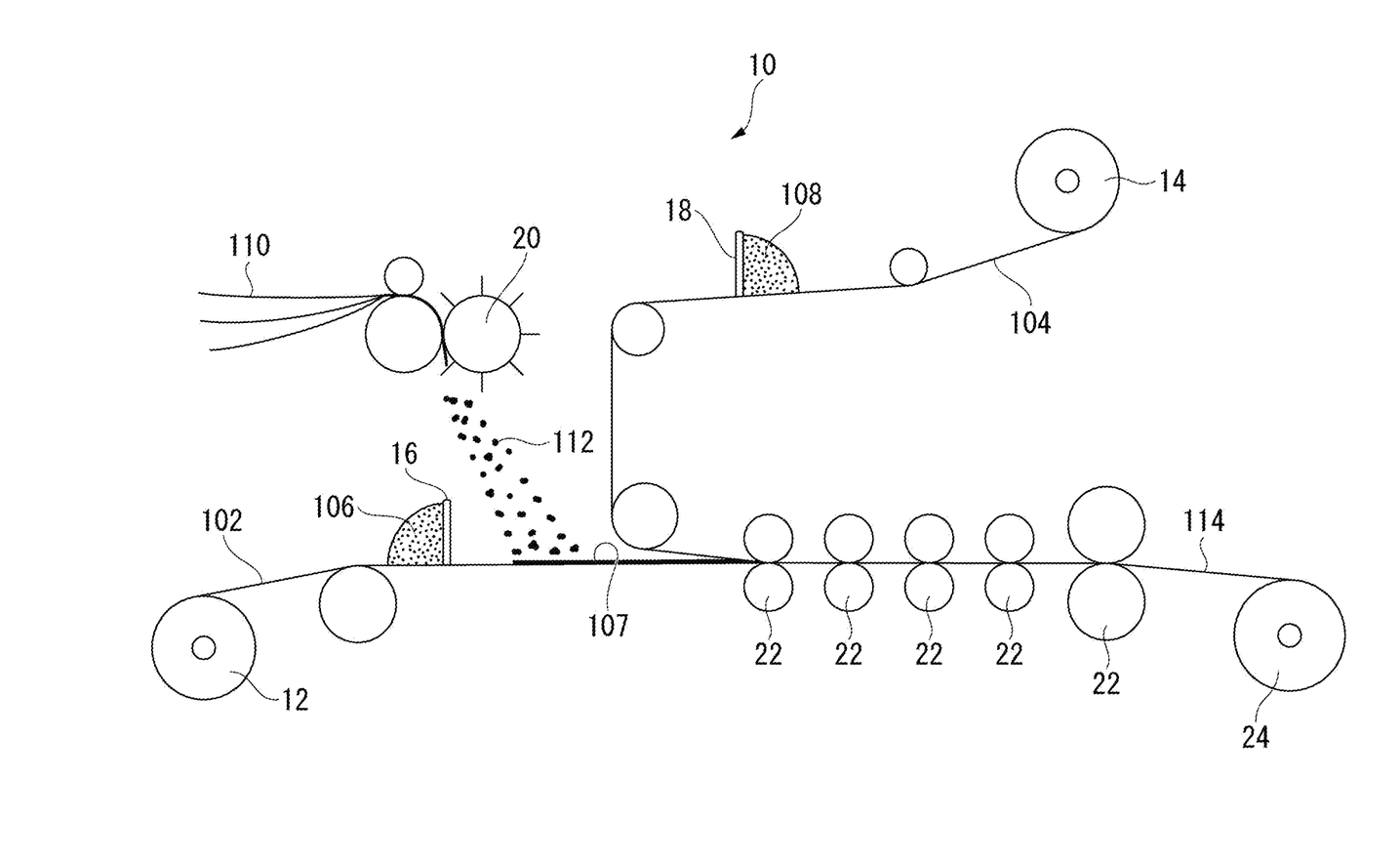
FIG. 1 is a schematic constitution view showing an example of an SMC producing apparatus.

FIG. 1 is a schematic constitution view showing an example of an SMC producing apparatus.

For the convenience of description, the dimensional ratio in FIG. 1 is different from the actual dimensional ratio.

The SMC producing apparatus 10 includes a first supply roll 12, a second supply roll 14, a first doctor blade 16, a second doctor blade 18, a chopper 20, a plurality of impregnation roll pairs 22, and a winding roll 24.

The first supply roll 12 supplies a first carrier film 102. The second supply roll 14 supplies a second carrier film 104.

By the first doctor blade 16, the surface of the first carrier film 102 supplied from the first supply roll 12 is coated with a thermosetting resin composition (B) 106. By the second doctor blade 18, the surface of the second carrier film 104 supplied from the second supply roll 14 is coated with a thermosetting resin composition (B) 108.

The chopper 20 cuts a carbon fiber tow 110, scatters cut short fiber tows 112 onto the thermosetting resin composition (B) 106 on the surface of the first carrier film 102 such that a fiber substrate (A) 107 is formed.

In the SMC producing apparatus 10, the first carrier film 102 that is coated with the thermosetting resin composition (B) 106 and includes the fiber substrate (A) 107 formed on the composition (B) 106 and the second carrier film 104 that is coated with the thermosetting resin composition (B) 108 are stacked such that the fiber substrate (A) 107 and the thermosetting resin composition (B) 108 contact each other. In this way, a laminated sheet 114 is prepared.

Each of the impregnation roll pairs 22 is constituted such that the laminated sheet 114 passes between the rolls.

The winding roll 24 winds up the laminated sheet 114 that has passed through the impregnation roll pairs 22.

SMC is produced as below by using the SMC producing apparatus 10.

The surface of the first carrier film 102 supplied from the first supply roll 12 is uniformly coated with the thermosetting resin composition (B) 106 at a predetermined thickness by using the first doctor blade 16.

A plurality of carbon fiber tows 110 supplied from a plurality of bobbins are cut by the chopper 20 such that the average fiber length thereof becomes 5 mm or more. In addition, short fiber tows 112 generated by the cutting are scattered and deposited in the form of a sheet on the thermosetting resin composition (B) 106 on the surface of the first carrier film 102. In this case, the fiber substrate (A) 107 is formed.

The surface of the second carrier film 104 supplied from the second supply roll 14 is uniformly coated with the thermosetting resin composition (B) 108 at a predetermined thickness by using the second doctor blade 18.

The first carrier film 102 that is coated with the thermosetting resin composition (B) 106 and includes the fiber substrate (A) 107 formed of the short fiber tows 112 deposited on the composition (B) 106 so as to be two-dimensionally and randomly aligned and the second carrier film 104 that is coated with the thermosetting resin composition (B) 108 are stacked such that the fiber substrate (A) 107 and the thermosetting resin composition (B) 108 contact each other. In this way, the laminated sheet 114 is prepared.

The laminated sheet 114 is caused to sequentially pass through the plurality of impregnation roll pairs 22 such that the sheet-like fiber substrate (A) 107 is impregnated with the thermosetting resin composition (B) from the upper and lower surface thereof.

The laminated sheet 114 having passed through the impregnation roll pairs 22 is wound up around the winding roll 24, then left to age for several days at a temperature 10° C. or more and 50° C. or less such that the thermosetting resin composition (B) is thickened, thereby obtaining SMC.

It is preferable that the thermosetting resin composition (B) has viscosity at which the fiber substrate (A) can be impregnated with the composition (B) but the resin composition does not drip from the side of the carrier film. Furthermore, it is preferable that the viscosity of the aged thermosetting resin composition (B) is increased to such a degree that the carrier film can be easily exfoliated.

<Carbon Fiber Composite Material Molded Article>

The molded article of the present invention includes a thick portion that is formed of a cured material of SMC of the present invention and has a thickness of 10 mm or more. The molded article of the present invention may be a molded article that is totally constituted with a thick portion having a thickness of 10 mm or more, or a molded article that includes a thick portion having a thickness of 10 mm or more and a thin portion having a thickness less than 10 mm.

The thickness of the thick portion can be appropriately set as long as it is 10 mm or more. For example, the thickness of the thick portion can be 10 mm or more and 40 mm or less.

The specific gravity of the molded article of the present invention is preferably 1.56 or less, more preferably 1.53 or less, even more preferably 1.50 or less, and particularly preferably 1.47 or less. In a case where the specific gravity of the molded article is the upper limit of the above range or less, the molded article is useful as a lightweight molded article.

The lower limit of the specific gravity of the molded article of the present invention is not particularly limited. The specific gravity of the molded article is generally 1.33 or more.

As the method for producing the molded article of the present invention, for example, known press-molding methods can be adopted without particular limitation.

An appropriate amount of SMC of the present invention is put into a die (constituted with a lower die and an upper die) for molding a thick portion that is mounted on a press machine. By using the press machine, the die controlled (heated) to a predetermined temperature is clamped. While being heated, SMC is compressed by the upper die and the lower die. In this way, SMC is shaped in the form of the die. In the clamped die, SMC is cured by being kept as it is for a predetermined period of time. The die is cooled, and then the molded article is taken out of the die.

As described above, in the present invention, SMC is used which contains the fiber substrate (A) containing carbon fiber having an average fiber length 5 mm or more and thermosetting resin composition (B) having a volumetric molding shrinkage rate 0.5% or more and 4.4% or less. The use of the fiber substrate (A) makes it possible to obtain a molded article having excellent mechanical characteristics.

Furthermore, because the volumetric molding shrinkage rate of the thermosetting resin composition (B) is controlled within the above range, the occurrence of internal distortion is inhibited even during the molding of a thick portion. Therefore, internal cracks hardly occur, and the molded article has excellent die release properties.

EXAMPLES

Hereinafter, the present invention will be specifically described using examples, but the present invention is not limited to the following description.

<Volumetric Molding Shrinkage Rate>

The volumetric molding shrinkage rate (%) of a thermosetting resin composition was calculated by the following equation by using a difference between specific gravities that were measured before and after curing according to a density measurement method (JIS K-5600 2-4).

$$r=\{(ds-dl)/dl\}\times 100$$

(In the above equation, r represents a volumetric molding shrinkage rate (%); dl represents a specific gravity of a liquid thermosetting resin composition that is measured before the composition is cured; and ds represents a specific gravity of a cured material of the thermosetting resin composition.)

The specific gravity dl was measured for a liquid thermosetting resin composition by a specific gravity bottle method before the composition is cured.

The specific gravity ds was measured by the following method. A die was charged with the thermosetting resin composition, and the composition was cured by being heated and pressed for 2 minutes under the conditions of a die temperature of 140° C. and a pressure of 10 MPa, thereby obtaining a flat plate-like thermosetting resin molded article having a size of 200 mm×140 mm×2 mm (thickness). By using the obtained thermosetting resin molded article, the specific gravity ds was measured by a specific gravity measurement method for solids (weighing in a liquid).

<Specific Gravity of Molded Article>

The specific gravity of the carbon fiber composite material molded article produced in each example was measured by a specific gravity measurement method for solids (weighing in a liquid).

<Evaluation Method>

(Die Release Properties)

For the carbon fiber composite material molded article (a thick molded article) produced in each example, how well the molded articles are released from the die was evaluated. An example in which the molded article was smoothly released from the die was marked with "Excellent (○)". An example in which the molded article stuck to the die when released was marked with "Poor (X)".

(Internal Crack)

Three carbon fiber composite material molded articles (thick molded articles) produced in each example were cut, and the way the internal cracks occur in the cut portions was visually checked. An example in which internal cracks occurred in none of the three molded articles was marked with "○". An example in which internal cracks occurred in one molded article or two molded articles was marked with "Δ". An example in which internal cracks occurred in all of the three molded articles was marked with "X".

<Raw Materials>

The raw materials used in the present example are as follows.

(Thermosetting Resin)

Thermosetting resin (a-1): a vinyl ester resin (manufactured by Japan U-Pica Company Ltd., NEOPOL (registered trademark) 8051, containing an epoxy (meth)acrylate resin, an unsaturated polyester resin, and styrene).

Thermosetting resin (a-2): a mixture of 90 parts by mass of a liquid bisphenol A epoxy resin (manufactured by Mitsubishi Chemical Corporation, jER (registered trademark) 828) and 10 parts by mass of N,N,N',N'-tetraglycidyl-m-xylylenediamine (manufactured by MITSUBISHI GAS CHEMICAL COMPANY, INC., TETRAD-X).

Thermosetting resin (a-3): a liquid bisphenol A epoxy resin (manufactured by Mitsubishi Chemical Corporation, jER (registered trademark) 827).

(Other Components)

Reactive diluent (b-1): a mixture of 5 parts by mass of 2-ethylhexyl glycidyl ether (manufactured by Mitsubishi Chemical Corporation, YED188) and 12 parts by mass of 1,6-hexanediol diglycidyl ether (manufactured by Mitsubishi Chemical Corporation, YED216M).

Shrinkage reducing agent (c-1): polyfunctional (meth)acrylate (manufactured by Mitsubishi Chemical Corporation, ACRYESTER PBOM, polybutylene glycol di(meth)acrylate (n=8, 9)).

Thickener (d-1): modified diphenylmethane diisocyanate (manufactured by Mitsui Chemicals, Inc., COSMONATE (registered trademark) LL).

Thickener (d-2): 3-methyl-1,2,3,6-tetrahydrophthalic anhydride and 4-methyl-1,2,3,6-tetrahydrophthalic anhydride (manufactured by Hitachi Chemical Co., Ltd., HN-2200).

Thickener (d-3): 3,3'-dimethyl-4,4'-diaminodicyclohexylmethane (manufactured by Mitsubishi Chemical Corporation, jER CURE (registered trademark) 113).

Curing agent (e-1): 0.5 part by mass of a 75% solution of 1,1-di(t-butylperoxy)cyclohexane (manufactured by NOF CORPORATION, PERHEXA (registered trademark) C-75 (EB)) and 0.5 parts by mass of a 74% solution of t-butylperoxyisopropyl carbonate (manufactured by Kayaku Akzo Corporation, KAYACARBONE (registered trademark) BIC-75).

Curing agent (e-2): 1 part by mass of dicyandiamide (manufactured by Air Products and Chemicals, Inc., DICYANEX 1400F) and 6 parts by mass of 2,4-diamino-6-[2'-methylimidazolyl-(1')]-ethyl-s-triazine (manufactured by SHIKOKU CHEMICALS CORPORATION, 2MZA-PW) (7 parts by mass in total).

Curing agent (e-3): 4 parts by mass of dicyandiamide (manufactured by Air Products and Chemicals, Inc., DICYANEX 1400F) and 4 parts by mass of 2,4-diamino-6-[2'-methylimidazolyl-(1')]-ethyl-s-triazine (manufactured by SHIKOKU CHEMICALS CORPORATION, 2MZA-PW) (8 parts by mass in total).

Internal release agent (f-1): a phosphoric acid ester-based derivative composition (manufactured by AXEL Plastics Research Laboratories, Inc., MOLD WIZINT-EQ-6).

Stabilizer (g-1): 1,4-benzoquinone.

Production Example 1

The thermosetting resin (a-1) (100 parts by mass), 50 parts by mass of the shrinkage reducing agent (c-1), 1 part by mass of the curing agent (e-1), 0.35 parts by mass of the internal release agent (f-1), 20 parts by mass of the thickener (d-1), and 0.02 parts by mass of the stabilizer (g-1) were thoroughly mixed and stirred together, thereby obtaining a thermosetting resin composition (B-1) in a paste state. The volumetric molding shrinkage rate of the thermosetting resin composition (B-1) was 4.2%.

Production Example 2

The thermosetting resin (a-2) (100 parts by mass) and 7 parts by mass of the curing agent (e-2) were mixed in advance and kneaded with a triple roll. The obtained mixture was mixed with 14 parts by mass of the thickener (d-2), thereby obtaining a thermosetting resin composition (B-2) in a paste state. The volumetric molding shrinkage rate of the thermosetting resin composition (B-2) was 2.9%.

Production Example 3

The liquid bisphenol A epoxy resin (manufactured by Mitsubishi Chemical Corporation, jER (registered trademark) 827) (83 parts by mass) and 8 parts by mass of the curing agent (e-3) were mixed together in advance and kneaded with a triple roll. The obtained mixture was mixed with 17 parts by mass of the reactive diluent (b-1) and 11 parts by mass of the thickener (d-3), thereby obtaining a thermosetting resin composition (B-3) in a paste state. The volumetric molding shrinkage rate of the thermosetting resin composition (B-3) was 3.5%.

Production Example 4

A thermosetting resin composition (X-1) in a paste state was obtained in the same manner as in Production Example 1, except that the shrinkage reducing agent (c-1) was not used. The volumetric molding shrinkage rate of the thermosetting resin composition (X-1) was 6.9%.

Production Example 5

A thermosetting resin composition (X-2) in a paste state was obtained in the same manner as in Production Example 1, except that the amount of the shrinkage reducing agent (c-1) used was changed to 30 parts by mass. The volumetric molding shrinkage rate of the thermosetting resin composition (X-2) was 6.6%.

Example 1

By using a doctor blade, a carrier film made of polyethylene was coated with the thermosetting resin composition (B-1) obtained in Production Example 1 such that the thickness of the composition became 1.0 mm. On the applied thermosetting resin composition (B-1), chopped carbon fiber tows, which were obtained by cutting a carbon fiber tow constituted with 15,000 filaments (manufactured by Mitsubishi Chemical Corporation, TR50S 15L) in an average fiber length of 25 mm, were scattered such that the basis weight of the carbon fiber became substantially uniform and the fiber in the carbon fiber tows was aligned in random directions. In this way, a fiber substrate (A-1) was formed.

By using a doctor blade, another carrier film made of polyethylene was coated with the thermosetting resin composition (B-1) such that the thickness of the composition became 1.0 mm.

The fiber substrate (A-1) was interposed between the two sheets of carrier films such that the side of the thermosetting resin composition (B-1) became inside. The obtained laminate was pressed between the impregnation roll pairs such that the fiber substrate (A-1) was thoroughly impregnated with the thermosetting resin composition (B-1), thereby obtaining a sheet-like SMC precursor. The SMC precursor was left to stand for 120 hours at room temperature (23° C.) such that the thermosetting resin composition (B-1) in the SMC precursor was fully thickened, thereby obtaining CF-SMC (C-1). The content rate of carbon fiber in CF-SMC (C-1) was 50 mass %.

A die was charged with a charge material, which was prepared by cutting CF-SMC (C-1) in a size of 180 mm×135 mm and laminating the cut pieces, at a charge ratio (a ratio of the area of the charge material to the area of the die) of 87%. The resin composition in the charge material was cured by being heated and pressed under the conditions of a die temperature of 140° C. and a pressure of 10 MPa, thereby obtaining a flat plate-like carbon fiber composite material molded article having a size of 200 mm×140 mm×6 mm (thickness). In addition, carbon fiber composite material molded articles were produced in the same manner as in Example 1, except that the thickness was changed to 8 mm, 10 mm, 12 mm, 15 mm, and 20 mm. In each example, three carbon fiber composite material molded articles having different thicknesses were produced.

The pressing time in the die was set such that a carbon fiber composite material molded article of interest was pressed for 1 minute per thickness of 1 mm of the material. For example, in a case where a carbon fiber composite material molded article of interest is 10 mm thick, the pressing time is 10 minutes, and in a case where a carbon fiber composite material molded article of interest is 20 mm thick, the pressing time is 20 minutes.

Examples 2 and 3

CF-SMC (C-2) and (C-3) were prepared in the same manner as in Example 1, except that the thermosetting resin composition (B-1) was changed to the thermosetting resin compositions (B-2) and (B-3) as shown in Table 1.

Carbon fiber composite material molded articles were produced in the same manner as in Example 1, except that CF-SMC (C-2) and (C-3) were used instead of CF-SMC (C-1).

Comparative Examples 1 and 2

CF-SMC (C-4) was prepared in the same manner as in Example 1, except that the thermosetting resin composition (B-1) was changed to the thermosetting resin compositions (X-1) and (X-2) as shown in Table 1.

A carbon fiber composite material molded article was produced in the same manner as in Example 1, except that CF-SMC (C-4) was used instead of CF-SMC (C-1).

Table 1 shows the measurement results of physical properties of the thermosetting resin compositions in examples and comparative examples and the evaluation results of specific gravity, internal cracks, and die release properties of the carbon fiber composite material molded articles in examples and comparative examples.

TABLE 1

| | | Example 1 | Example 2 | Example 3 | Comparative Example1 | Comparative Example2 |
|---|---|---|---|---|---|---|
| Type of CF-SMC | | C-1 | C-2 | C-3 | C-4 | C-5 |
| Type of thermosetting resin composition | | B-1 | B-2 | B-3 | X-1 | X-2 |
| Formulation of thermosetting resin composition [part by mass] | Thermosetting resin (a-1) | 100 | | | 100 | 100 |
| | Thermosetting resin (a-2) | | 100 | | | |
| | Thermosetting resin (a-3) | | | 83 | | |
| | Reactive diluent (b-1) | | | 17 | | |
| | Shrinkage reducing agent (c-1) | 50 | | | | 30 |
| | Thickener (d-1) | 20 | | | 20 | 20 |
| | Thickener (d-2) | | 14 | | | |
| | Thickener (d-3) | | | 11 | | |
| | Curing agent (e-1) | 1 | | | 1 | 1 |
| | Curing agent (e-2) | | 7 | | | |
| | Curing agent (e-3) | | | 8 | | |
| Specific gravity dl of thermosetting resin composition before curing | | 1.105 | 1.175 | 1.142 | 1.129 | 1.098 |
| Specific gravity ds of thermosetting resin composition after curing | | 1.153 | 1.211 | 1.183 | 1.204 | 1.176 |
| Volumetric shrinkage rate of thermosetting resin composition (B) [%] | | 4.2 | 2.9 | 3.5 | 6.9 | 6.6 |
| Content rate of carbon fiber in CF-SMC [mass %] | | 50 | 50 | 50 | 50 | 50 |
| Specific gravity of carbon fiber composite material molded article | | 1.45 | 1.46 | 1.45 | 1.46 | 1.45 |
| Internal cracks of molded article | Thickness 6 mm | ◯ | ◯ | ◯ | ◯ | ◯ |
| | Thickness 8 mm | ◯ | ◯ | ◯ | X | ◯ |
| | Thickness 10 mm | ◯ | ◯ | ◯ | X | X |
| | Thickness 12 mm | Δ | ◯ | ◯ | X | X |
| | Thickness 15 mm | X | ◯ | ◯ | X | X |
| | Thickness 20 mm | X | ◯ | ◯ | X | X |
| Die release properties | | ◯ | ◯ | ◯ | ◯ | ◯ |

As shown in Table 1, it has been found that Examples 1 to 3 using the thermosetting resin compositions (B-1) to (B-3) satisfying the regulation of volumetric molding shrinkage rate bring about an internal crack inhibition effect in thicker molded articles, compared to Comparative Examples 1 and 2 using the thermosetting resin compositions having a volumetric molding shrinkage rate higher than 4.5%. Furthermore, in Examples 1 to 3, sufficient die release properties were also obtained.

REFERENCE SIGNS LIST

10 SMC producing apparatus
12 First supply roll
14 Second supply roll
16 First doctor blade
18 Second doctor blade
20 Chopper
22 Impregnation roll pair
24 Winding roll
102 First carrier film
104 Second carrier film
106 Thermosetting resin composition (B)
108 Thermosetting resin composition (B)
110 Carbon fiber tow
112 Short fiber tow
114 Laminated sheet

The invention claimed is:

1. A sheet molding compound comprising:
a fiber substrate (A) comprising carbon fiber; and
a thermosetting resin composition (B),
wherein the thermosetting resin composition (B) comprises a vinyl ester resin and a shrinkage reducing agent,
wherein the shrinkage reducing agent comprises a polyfunctional (meth)acrylate,
wherein the polyfunctional (meth)acrylate is in liquid state at room temperature, and
wherein an average fiber length of the carbon fiber is 5 mm or more.

2. The sheet molding compound according to claim 1, wherein a content of the carbon fiber in the sheet molding compound (100 mass %) is 30 mass % or more and 70 mass % or less.

3. The sheet molding compound according to claim 1, wherein a volumetric molding shrinkage rate of the thermosetting resin composition (B) is 0.5% or more and 4.4% or less.

4. A carbon fiber composite material molded article comprising a cured material of the sheet molding compound according to claim 1.

5. The carbon fiber composite material molded article according to claim 4, wherein the carbon fiber composite material molded article comprises a thick portion having a thickness of 10 mm or more and formed of the cured material.

6. The carbon fiber composite material molded article according to claim 5, wherein the carbon fiber composite material molded article has a specific gravity of 1.56 or less.

7. A method for producing a carbon fiber composite material molded article, wherein the method comprises heating and compressing the sheet molding compound according to claim 1 by press-molding method.

8. The method according to claim 7, wherein the carbon fiber composite material molded article comprises a thick portion having a thickness of 10 mm or more and formed of a cured material of the sheet molding compound.

9. A method of producing a sheet molding compound comprising:
preparing a fiber substrate (A) comprising carbon fiber; and
impregnating the fiber substrate (A) with a thermosetting resin composition (B),
wherein the thermosetting resin composition (B) comprises a vinyl ester resin and a shrinkage reducing agent,
wherein the shrinkage reducing agent comprises a polyfunctional (meth)acrylate,
wherein the polyfunctional (meth)acrylate is in liquid state at room temperature, and
wherein an average fiber length of the carbon fiber is 5 mm or more.

10. The method according to claim 9, the method further comprising thickening the thermosetting resin composition (B) after the impregnating of the fiber substrate (A) with the thermosetting resin composition (B).

11. The method according to claim 9, wherein a content of the carbon fiber in the sheet molding compound (100 mass %) is 30 mass % or more and 70 mass % or less.

12. The method according to claim 9, wherein a volumetric molding shrinkage rate of the thermosetting resin composition (B) is 0.5% or more and 4.4% or less.

13. A sheet molding compound comprising:
a fiber substrate (A) comprising carbon fiber; and
a thermosetting resin composition (B),
wherein the thermosetting resin composition (B) comprises a vinyl ester resin, a shrinkage reducing agent, an unsaturated polyester resin, a polyisocyanate compound, and a reactive diluent,
wherein the reactive diluent comprises one or more selected from the group consisting of a vinyl monomer and a monofunctional (meth)acrylate, and
wherein an average fiber length of the carbon fiber is 5 mm or more.

14. The sheet molding compound according to claim 13, wherein a volumetric molding shrinkage rate of the thermosetting resin composition (B) is 0.5% or more and 4.4% or less.

15. The sheet molding compound according to claim 13, wherein the shrinkage reducing agent comprises a polyfunctional (meth)acrylate.

16. The sheet molding compound according to claim 15, wherein the polyfunctional (meth)acrylate is in liquid state at room temperature.

17. A carbon fiber composite material molded article comprising a cured material of the sheet molding compound according to claim 13.

18. A method of producing a sheet molding compound comprising:
preparing a fiber substrate (A) comprising carbon fiber; and
impregnating the fiber substrate (A) with a thermosetting resin composition (B),
wherein the thermosetting resin composition (B) comprises a vinyl ester resin, a shrinkage reducing agent, an unsaturated polyester resin, a polyisocyanate compound, and a reactive diluent,
wherein the reactive diluent comprises one or more selected from the group consisting of a vinyl monomer and a monofunctional (meth)acrylate, and
wherein an average fiber length of the carbon fiber is 5 mm or more.

19. The method according to claim 18, wherein a volumetric molding shrinkage rate of the thermosetting resin composition (B) is 0.5% or more and 4.4% or less.

20. The method according to claim 18, wherein the shrinkage reducing agent comprises a polyfunctional (meth) acrylate.

21. The method according to claim 20, wherein the polyfunctional (meth)acrylate is in liquid state at room temperature.

* * * * *